United States Patent [19]

Spangjer

[11] Patent Number: 5,408,973
[45] Date of Patent: Apr. 25, 1995

[54] INTERNAL COMBUSTION ENGINE FUEL SUPPLY SYSTEM AND METHOD

[76] Inventor: Keith G. Spangjer, 8537 E. Orange Blossom, Scottsdale, Ariz. 85250

[21] Appl. No.: 157,540

[22] Filed: Nov. 26, 1993

[51] Int. Cl.$^6$ .......................................... F02M 31/00
[52] U.S. Cl. .................................. 123/478; 123/557; 123/538; 123/556; 123/555
[58] Field of Search ............... 123/557, 556, 543, 555, 123/545, 552, 536, 537, 538, 472, 478; 65/110, 52

[56] References Cited

U.S. PATENT DOCUMENTS

| | | | |
|---|---|---|---|
| 756,834 | 4/1904 | Denison | 123/557 |
| 1,217,233 | 2/1917 | Squire | 123/555 |
| 1,325,850 | 12/1919 | Humphreys | 123/557 |
| 2,711,718 | 6/1955 | Spanjer | |
| 3,496,919 | 2/1970 | Gerrard | 123/545 |
| 3,762,378 | 10/1973 | Bitonti | 123/557 |
| 3,765,382 | 10/1973 | Vandenberg | 123/557 |
| 4,106,453 | 8/1978 | Burley | 123/555 |
| 4,112,896 | 9/1978 | Akado et al. | 123/556 |
| 4,126,110 | 11/1978 | Simmons | 123/556 |
| 4,161,930 | 7/1979 | Bendig et al. | 123/556 |
| 4,201,167 | 5/1980 | Bayley | |
| 4,267,976 | 5/1981 | Chatwin | 123/538 |
| 4,372,278 | 2/1983 | Smith | 123/478 |
| 4,550,706 | 11/1985 | Hoffman | 123/557 |
| 4,590,912 | 5/1986 | Atago | 123/478 |
| 4,611,567 | 9/1986 | Covey | 123/557 |
| 4,644,925 | 2/1987 | Hoppie et al. | 123/558 |
| 4,669,433 | 6/1987 | Hoppie | 123/538 |
| 4,784,092 | 11/1988 | Pitti | 123/525 |
| 4,909,192 | 3/1990 | Förster et al. | 123/557 |
| 4,926,831 | 5/1990 | Earl | 123/557 |
| 5,035,227 | 7/1991 | Hansen | 123/557 |
| 5,092,303 | 3/1992 | Brown | 123/538 |

*Primary Examiner*—Andrew M. Dolinar
*Assistant Examiner*—M. Macy
*Attorney, Agent, or Firm*—Cahill, Sutton & Thomas

[57] ABSTRACT

A fuel supply system and method incorporates a fuel pump for pressurizing liquid fuel for use in an internal combustion engine. The pressurized fuel is supplied to a fuel injector mounted on a vaporization chamber; actuation signals applied to the fuel injector atomize a metered quantity of liquid fuel into the chamber. The atomized fuel travels a tortuous path in the chamber striking chamber walls heated by hot exhaust gas from the internal combustion engine. Vaporized fuels delivered from the vaporization chamber to a mixing chamber to be mixed with air to form a combustible fuel/air mixture. Air supplied to the mixing chamber is heated by exhaust heat prior to delivery to the mixing chamber. The combustible fuel/air mixture is then supplied to the intake manifold of the internal combustion engine.

16 Claims, 3 Drawing Sheets

INTERNAL COMBUSTION ENGINE FUEL SUPPLY SYSTEM AND METHOD

FIELD OF THE INVENTION

The present invention relates to an internal combustion engine fuel system, and more particularly to systems and methods for vaporizing liquid fuel for mixing with air to be used as a combustible mixture in the engine.

BACKGROUND OF THE INVENTION

Present day internal combustion engines, such as the typical automotive engine, require that a fuel/air mixture be delivered to each of the combustion chambers to subsequently be ignited for the extraction of energy to produce the work of the engine. Creating a fuel/air mixture having the proper proportions to provide clean and efficient burning of the fuel has been the purpose of fuel delivery systems in the prior art. The conventional carburetor attempts to provide the appropriate fuel/air mixture throughout a broad range of engine operation by metering liquid fuel into an air stream; elaborate techniques have been employed to achieve the correct fuel/air mixture throughout a broad range of engine operation. However, the liquid fuel is seldom completely vaporized in the ideal proportions and the resulting fuel/air mixture is poorly controlled, poorly distributed, and very inefficiently utilized.

In an attempt to more accurately control the fuel/air mixture to meet the varying demands of the engine during operation, fuel injection systems have been employed for directing a measured spray or atomized quantity of liquid fuel into an air stream to be mixed with the air to provide a fuel/air mixture for combustion. Such atomizers or fuel injectors have been placed in the same position as conventional carburetors (throttle body injection) or more efficiently have been distributed along the intake manifold with an injector located at an appropriate position adjacent each inlet of the respective cylinders. With the advent of more sophisticated electronic controls, it has been possible to more accurately control the operation of these fuel injectors for the measurement of the correct amount of liquid fuel to be injected into the air stream to provide a proper fuel/air mixture. Numerous engine operational parameters can be sensed and converted into appropriate electrical signals for application through a computerized system to electrically energize the respective fuel injectors at the appropriate time and duration.

All of the above prior art systems depend upon the introduction of liquid fuel into an air stream. The fuel/air mixture that is required for proper combustion is a mixture of air and fuel vapor; therefore, for ideal mixing, fuel vapor, and not liquid fuel, should be the constituent to be mixed with the air. Incomplete or uneven vaporization of fuel causing variations in the mixture ratio or imbalances in the mixture delivered to different cylinders greatly reduces the efficiency of the overall engine system. Further, improper fuel/air mixtures or improper control of the mixture and deviation of the mixture from ideal is a major contributor to atmospheric polluting combustion products.

Prior art fuel supply systems also include techniques for vaporizing the liquid fuel prior to combining the fuel with air. Such systems are generally known as vapor carburetors and usually provide a means for heating the liquid fuel to a vapor state before providing the vaporized fuel to a mixing device such as a carburetor to provide an appropriate fuel/air mixture. Such prior art vapor carburetors have not been able to provide a means for controlling the vaporization of the liquid fuel so as to insure complete vaporization while supplying and controlling the quantity of vapor provided to the fuel/air mixing device.

OBJECTS OF THE INVENTION

It is therefore an object of the present invention to provide an improved fuel supply system and method for use in an internal combustion engine.

It is also an object of the present invention to provide a fuel supply system and method incorporating a fuel vaporizing technique to insure complete vaporization of a liquid fuel prior to mixing the fuel with air.

It is another object of the present invention to provide an improved fuel supply system for use with an internal combustion engine wherein a vaporization chamber is utilized to extract the heat of the engine exhaust for the vaporization of a metered quantity of liquid fuel to be mixed with air for use in the engine.

It is still another object of the present invention to provide an internal combustion engine fuel supply system having a vaporization chamber incorporating a tortuous path for guiding metered quantities of liquid fuel to be vaporized therein and wherein engine exhaust heat is utilized to supply the heat of vaporization.

It is still another object of the present invention to provide an improved fuel supply system and method for an internal combustion engine wherein engine operating parameters as detected by conventional sensors are utilized to control a liquid fuel metering system for the injection of the liquid fuel into a vaporization chamber.

These and other objects of the present invention will become apparent to those skilled in the art at the description thereof proceeds.

SUMMARY OF THE INVENTION

Briefly, in accordance with the embodiment chosen for illustration, the present invention uses components which are generally readily available for use with the internal combustion engines. Fuel, such as gasoline or a mixture of gasoline with other fuels such as alcohol, is stored in a fuel tank and is pressurized utilizing a conventional fuel pump to supply pressurized fuel to a fuel atomization device such as a fuel injector. The fuel injector may be of a type presently readily available and which is electrically actuated to provide a fine spray of liquid fuel into a vaporization chamber. The fuel injector may operate for periods, the frequency and duration of which are determined in accordance with engine demands, to supply liquid fuel to the vaporization chamber.

The vaporization chamber is mounted within the engine exhaust gas stream and provides a tortuous path for the liquid fuel/fuel vapor as the vapor travels the length of the chamber. The vaporization chamber is constructed to insure the impact of liquid fuel droplets with the walls of the chamber with the subsequent complete vaporization of the liquid fuel. The vaporization chamber is constructed so that the liquid droplets entrained within the vapor strike the interior walls of the vaporization chamber and particularly ensure that the heavy ends of the fuel are subjected to impingement upon the walls of the vaporization chamber.

The completely vaporized fuel is then supplied to a mixing chamber such as a carburetor device where it is mixed with incoming air to provide the appropriate fuel/air mixture. The temperature of the incoming air is maintained sufficiently high to ensure the vaporized state of the fuel as it is transported from the mixing device to the individual cylinders; thus, the fuel vapor mixed with the incoming air is not permitted to cool sufficiently to create condensation and revert to the liquid state.

BRIEF DESCRIPTION OF THE DRAWINGS

The present invention may more readily be described by reference to the accompanying drawings in which.

DETAILED DESCRIPTION OF THE INVENTION

Figure 1:
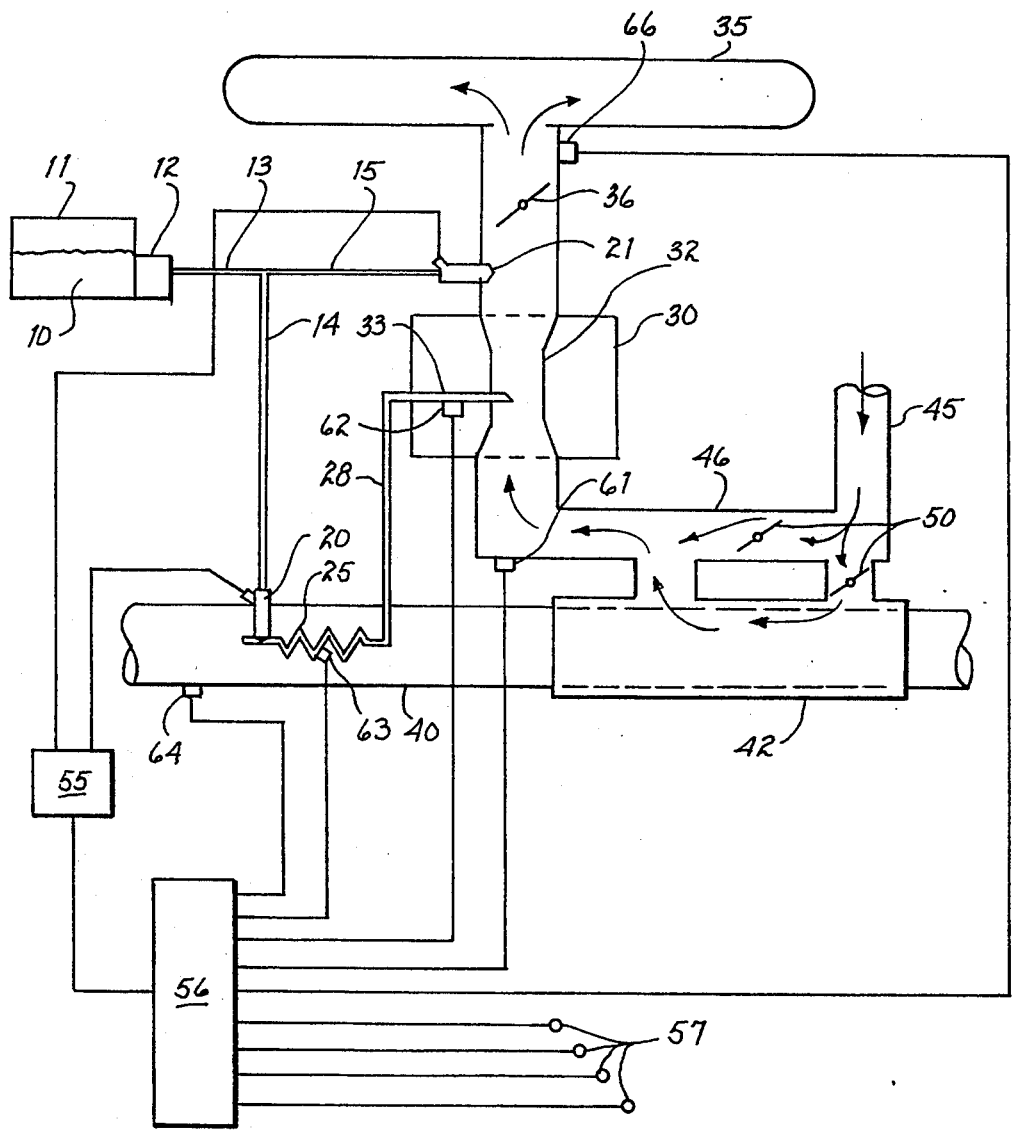
FIG. 1 is a diagram of an improved fuel supply system constructed in accordance with the teachings of the present invention.

Referring now to FIG. 1, liquid fuel 10 is contained within a conventional fuel tank 11 and is pressurized by fuel pump 12 to be delivered through fuel lines 13, 14 and 15. The pressure used in the embodiment for illustration may typically be in the 30-60 psi range that is usually found in present day fuel injection systems. The fuel is delivered to a primary injector 20 and a secondary injector 21. The fuel injectors 20 and 21 may be conventional readily available state of the art fuel injector devices or fuel atomizers that receive pressurized fuel and create fuel droplets or spray to be directed for use in the fuel/air mixing process. The amount of fuel supplied by the respective injectors is controlled in a manner typical in present fuel injection systems through the use of electrical signals that operate the injectors through electrical pulses having a frequency and duration in accordance with the fuel requirements of the engine. The primary fuel injector 20 is mounted on a fuel vaporization chamber 25 for directing liquid fuel spray into the chamber; the vaporized fuel is delivered through a fuel vapor supply tube 28 to a fuel/air mixing device 30. The fuel vapor supply tube may include insulation to maintain vapor temperature during transit from the vaporization chamber to the fuel/air mixing device 30; the tube 28 should be as short as possible to minimize the distance traveled by the fuel vapor and to minimize the amount of vapor in the system (to provide rapid response to engine demands).

The fuel/air mixing device 30 may take the form of a vapor carburetor having a venturi or throat 32 for the purpose of reducing the pressure at the inlet tube 33 supplying fuel vapor to the mixing device. It may be noted here that a venturi may not be necessary; that is, the pressure of the vapor supplied from the vaporization chamber is maintained at or above one atmosphere and does not rely on negative pressure at the point of introduction to the mixing device. Preferably, the chamber is maintained at approximately two atmospheres pressure to minimize lag in engine response. The fuel/air mixture is then admitted to intake manifold 35 past throttle valve 36. In the embodiment chosen for illustration, the diagram is necessarily schematic to permit a convenient description of the invention; it will be understood by those skilled in the art that the actual arrangement of the respective components will depend on the particular engine application and configuration.

Secondary fuel injector 21 may be positioned to provide atomized fuel injection into the incoming air stream during the start up of the engine before the engine is sufficiently warm to vaporize the fuel supplied through the vaporization chamber. Fuel injection provided by the secondary fuel injector 21 is operationally similar to conventional throttle body fuel injection. Under typical operating conditions, it is anticipated that the operational time required for the use of the secondary injector will be ten seconds or less.

The exhaust manifold 40 within which the vaporization chamber 25 is positioned is also utilized as a source of heat for warming incoming air to be mixed with the fuel vapor. A muff or jacket 42 surrounds the manifold 40 to permit incoming air to circulate between the jacket 42 and the manifold 40 to be heated thereby. Air admitted to the jacket 42 is supplied by air intake conduit 45 which supplies air to the jacket 42 and also supplies air directly to the mixing device 30 through conduct 46. The proportion of the incoming air that is directed to the jacket 42 is determined by the requirements of the intake air temperature which must be maintained sufficiently high to prevent the condensation of fuel as the incoming air is mixed with the fuel vapor. The proportion of fresh incoming air and heated incoming air may be regulated by the positioning of butterfly valves 50.

Primary and secondary fuel injectors 20 and 21, respectively, are electrically actuated by signals supplied by electronically controlled power module 55 controlled by logic module 56. Modules 55 and 56 are conventional electronic engine control systems found in present day vehicles. The logic module and power modules are typical applications of current computer control technology in modern IC engines. The modules may, for example, be based on the 6900 series semiconductor device manufactured by Motorola and may include well known state of the art supporting circuitry. The application of sensing signals to the logic module results in the development of time duration pulses supplied by the power module to the fuel injector to actuate the injector to atomize or spray a metered quantity of liquid fuel into the vaporization chamber. The modules incorporate processors for receiving signals from a plurality of sensors 57 and undertaking logical operations for the determination of the energization of the fuel injectors.

The various sensors used to supply input information to the logic module are readily available state of the art sensing devices found in present day automobiles. Sensors of specific use in application to the present invention may include a temperature sensor 61 for ascertaining the temperature of the air prior to entering the mixing device 30. In the present invention, the information relating to air temperature supplied to the mixing device is utilized to adjust the intake air heat such as by varying the positions of valves 50. If the air temperature reaches or approaches a predetermined temperature wherein condensation may occur, the valves may be positioned to direct incoming air through the sleeve 42 to warm the air. Conversely, when the air temperature becomes sufficiently high to negate the possibility of condensation, the valves may be repositioned to supply predominately fresh intake air bypassing the sleeve 42. The valves 50 will normally be positioned to provide a mix of heated and unheated intake air to arrive at an appropriate temperature to maintain the intake fuel/air charge temperature at an appropriate level.

Similarly, a vapor temperature sensor 62 is provided to produce signals corresponding to fuel vapor temperature to insure that the temperature exceeds that necessary to maintain the vapor state of the fuel and prevent fuel condensation; such condensation creates significant imbalance in the fuel/air ratio and thus varies the fuel/air mixture being supplied to the various cylinders. When engine starting occurs, and insufficient heat is available from exhaust gases to vaporize the fuel, the vaporization chamber temperature sensor 63 will produce a signal applied to the logic module 56 indicating that the temperature is too low to sustain appropriate fuel vaporization and that temporary provision must be made for supplying fuel to the incoming air stream. Accordingly, secondary injector 21 is energized for a period of time necessary for the engine to start and the exhaust gas temperature to rise sufficiently to vaporize the fuel in the vaporization chamber. Exhaust temperature sensor 64 similarly provides information to the logic module to assist in the determination of the selection of which of the primary and secondary fuel injectors 20 and 21, respectively, should be energized. Vacuum pressure sensor 66 may produce signals appropriately utilized by the logic module to vary the amount of fuel being injected by fuel injector 20 into the vaporization chamber 25. Similarly, other sensors typically found in present automotive engines may be used to provide information to the logic module concerning engine RPM, temperature, throttle position and exhaust oxygen. These sensors provide signals to the logic module to generate appropriate signals for application to the power module and thus create the necessary pulse frequency and duration to energize the fuel injector 20 to meter the appropriate quantity of fuel in the form of liquid for the current engine conditions. Other sensors frequently incorporated in present engines include knock sensors and infrared sensors; these sensing devices may also be incorporated in the system of the present invention to refine the control of the fuel injector.

Figure 2:
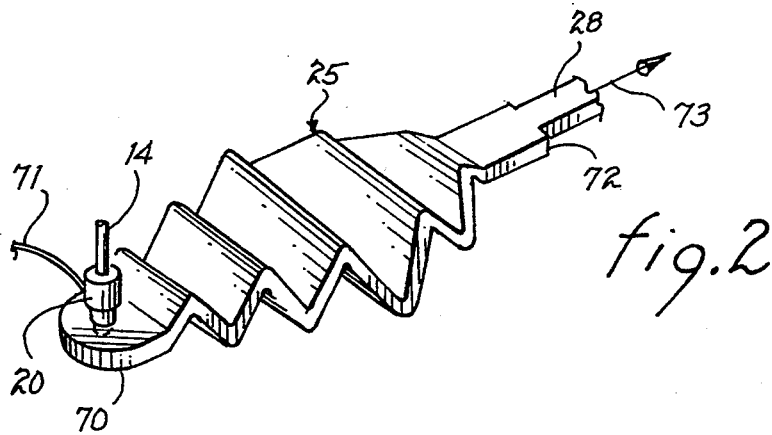
FIG. 2 is a perspective view of a vaporization chamber utilized in the system of the present invention.
Figure 3:
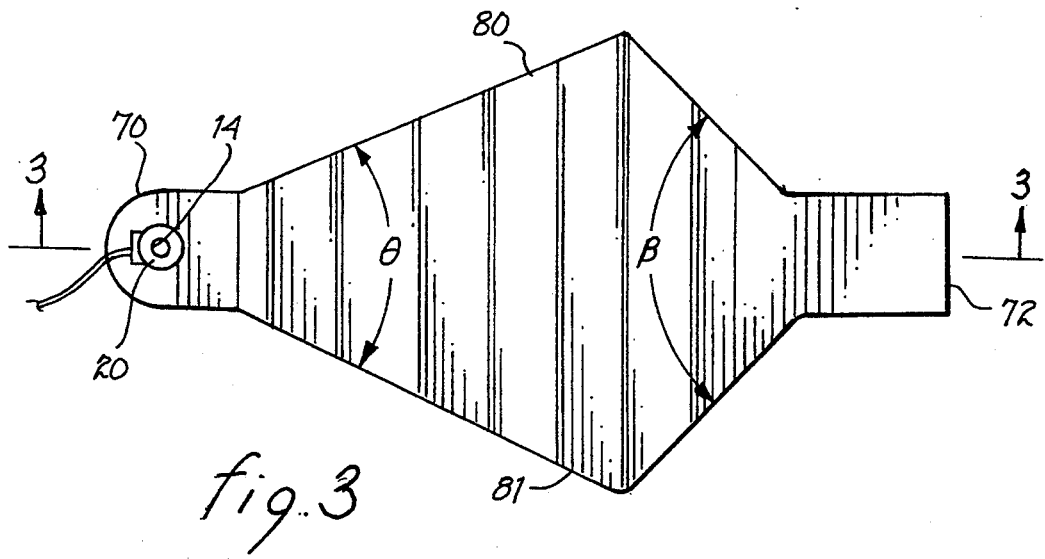
FIG. 3 is a top view of the vaporization chamber of FIG. 2.
Figure 4:
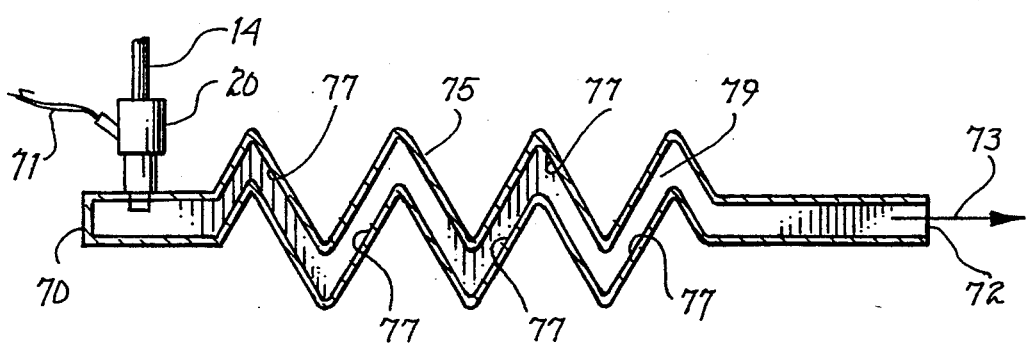
FIG. 4 is a cross-sectional view of the vaporization chamber of FIG. 3 taken along lines 4—4.

Referring now to FIGS. 2–4, the vaporization chamber 25 is shown in greater detail. The chamber is constructed from thin flat sheet metal formed as shown and includes a closed end 70 for supporting the fuel injector 20; the injector is supplied liquid fuel through fuel line 14 and is actuated through conductor 71 in a manner described in connection with FIG. 1. The fuel droplets or spray emanating from the fuel injector 20, when energized, provides atomized liquid fuel to the closed end of the vaporization chamber. Since the vaporization chamber is positioned in the hot exhaust stream, the contact of the atomized liquid fuel droplets with the interior surfaces 77 of the chamber immediately causes vaporization of a portion of the liquid fuel. As the fuel vapor and entrained fuel droplets travel toward the exit 72 of the chamber in the direction shown by the arrow 73, an increasing proportion of the fuel is converted to vapor. The path traveled by the vapor and fuel mixture is dictated by the configuration of the vaporization chamber; thus, a tortuous path ensures continuous impingement of the vapor/liquid fuel mixture with the interior surfaces of the chamber. This impingement assures that all of the liquid fuel is vaporized including the heavy ends of petroleum fuels.

In the embodiment chosen for illustration, the tortuous path is created by the accordion-like shape of the vaporization chamber. The top and bottom walls 75 and 78, respectively, are spaced apart and form a sawtooth path 79 therebetween. The sidewalls 80 and 81 first diverge and then converge along the direction of fuel flow. Therefore, as the liquid fuel is injected into the vaporization chamber and partially converts to vapor, the vapor/liquid fuel mixture traverses the interior of the vaporization chamber and continuously impacts on the interior surface of the uniformly thin walls of the chamber to ensure that all portions of the liquid fuel come into contact with a heated wall surface to thereby vaporize all liquid fuel. Since, in the chosen embodiment, the vaporization chamber is completely immersed in the exhaust stream, sufficient heat is available for maintaining the chamber in excess of 400° F., the vaporization temperature of conventional liquid fuel. The uniformly thin walls permit rapid heat transfer from the exhaust gases to the fuel; therefore, the fuel droplets that impinge on inner surface of the chamber walls are never further than the thickness of the thin wall from the hot gases.

To greatly enhance the vaporization of the liquid fuel, and to assist in the vaporization of even the heavy ends of petroleum fuels, the interior surface of the chamber is coated with a catalyst such as platinum. In the embodiment chosen for illustration, platinum is the catalyst of choice; the coating is preferably provided on the interior surface of the chamber using conventional plating techniques and is fifty micro-inches thick. The platinum surface also reduces the adhesion of residues and helps maintain the inner surfaces clean. The vaporization chamber increases in width so that the sides 80 and 81 subtend an included angle of from twenty degrees to ninety degrees and preferably approximately sixty degrees; toward the exit end of the chamber, the sides 80 and 81 close upon one another to form an included angle $\beta$ therebetween greater than $\Theta$ and preferably approximately ninety degrees. The increased volume required by the conversion of liquid to vapor is thus accommodated while nevertheless restricting the flow within the chamber to ensure maintaining pressure of the vapor within the chamber to provide pressure sufficient to supply the requirements of the engine upon demand. Chamber volume is kept to a minimum to reduce the mass of the fuel vapor being generated at any instant to thus permit rapid response to sudden engine demands. The exit pressure of the fuel vapor is maintained at or above one atmosphere and preferably close to two atmospheres. The higher pressure provides faster response times to engine demands and permits the rapid transfer of vaporized fuel from the vaporization chamber to the mixing device. Pressure within the chamber is created by the vaporization of liquid fuel through heat absorption from the chamber walls. The pressure is controlled by providing diverging sidewalls to accommodate the expanding liquid/vapor fuel mixture. As the mixture travels toward the exit of the chamber, it is confronted by converging sidewalls creating a limited restriction to further movement and providing a desired exit pressure. As the vapor/liquid mixture travels toward the exit, liquid is continuosly being vaporized thus increasing pressure and velocity; the increased velocity ensures that the remaining liquid fuel, including the heavy ends of petroleum fuel, strike a heated surface within the chamber and vaporize.

The fuel vaporization chamber may be constructed of any convenient material that can withstand the temperatures of exhaust gases and which is sufficiently mechanically strong to permit thin walls to facilitate heat transfer to the fuel from the high temperature of the exhaust gas. It has been found that 302 stainless steel having a thickness of from thirty to forty thousandths of an inch is an appropriate material with which to construct the vaporization chamber of the present invention. It has also been determined that the utilization of a conventional fuel injector will adequately supply a variety of engine sizes with vaporized fuel. A vaporization chamber having an inlet one inch in width, an outlet of one half inch in width, and a maximum width of four to five inches provides sufficient surface area for the efficient vaporization of the atomized fuel injected therein by the fuel injector. A vaporization chamber volume of 2.5 to 3.5 cubic inches is believed to be sufficient for efficient fuel vaporization for a variety of engine sizes. For engines in the range of 2.5 to 4 liters, a vaporization chamber volume of 3.5 cubic inches has been found to satisfactorily perform.

As described above, only a brief period of time (approximately ten seconds) is required for the engine to produce sufficiently hot exhaust gases to provide adequate vaporization to permit the engine thereafter to operate on the fuel/air mixture incorporating the vaporized fuel from the vaporization chamber. During the initial start-up period the secondary fuel injector may be utilized as a throttle body fuel injection system. As engine demands increase, and as engine output increases, greater demand for fuel vapor results in the increased energization of the fuel injector to provide greater quantities of atomized fuel. The increased liquid fuel being supplied to the vaporization chamber thus requires greater amount of heat for vaporization; however, as the engine output increases, the exhaust gas temperature also increases, thus providing sufficient heat for the vaporization of increased quantities of fuel.

Figure 5:
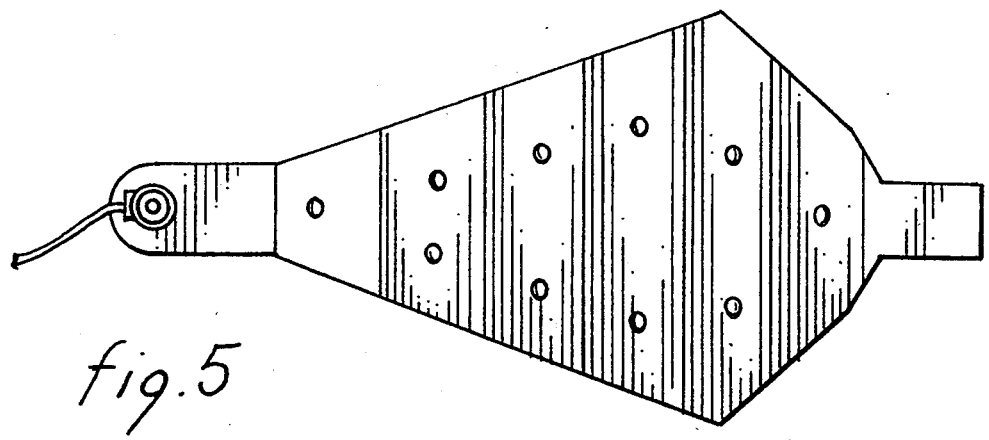
FIGS. 5 and 6 are a plan view and a cross-sectional view, respectively, of an alternative construction of the vaporization chamber of FIG. 2.
Figure 6:
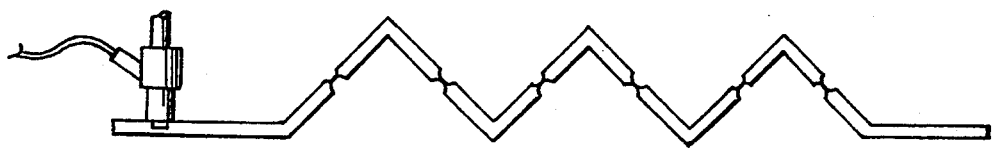

Referring to FIGS. 5 and 6, a modified form of the vaporization chamber of FIGS. 2-4 is shown. In FIGS. 5 and 6, the vaporization chamber has been structurally modified to increase the rigidity of the flat sides of the thin metal wall. Specifically, detents 85 have been formed in the top and bottom walls of the vaporization chamber. Upon assembly, the detents of the top and bottom walls are in registration and may conveniently be spot welded to thereby structurally join the top and bottom walls to add strength and rigidity to the walls and resist deformation of the walls caused by pressure gradients or variations within the vaporization chamber; increased pressures within the vaporization chamber may under certain circumstances create a "bulging" effect on the thin walls of the chamber which is effectively countered through the utilization of the spot welded detents. The detents also increase the path changes required of the vapor traveling in the chamber and provide additional surfaces for impingement of fuel droplets.

Figure 7:
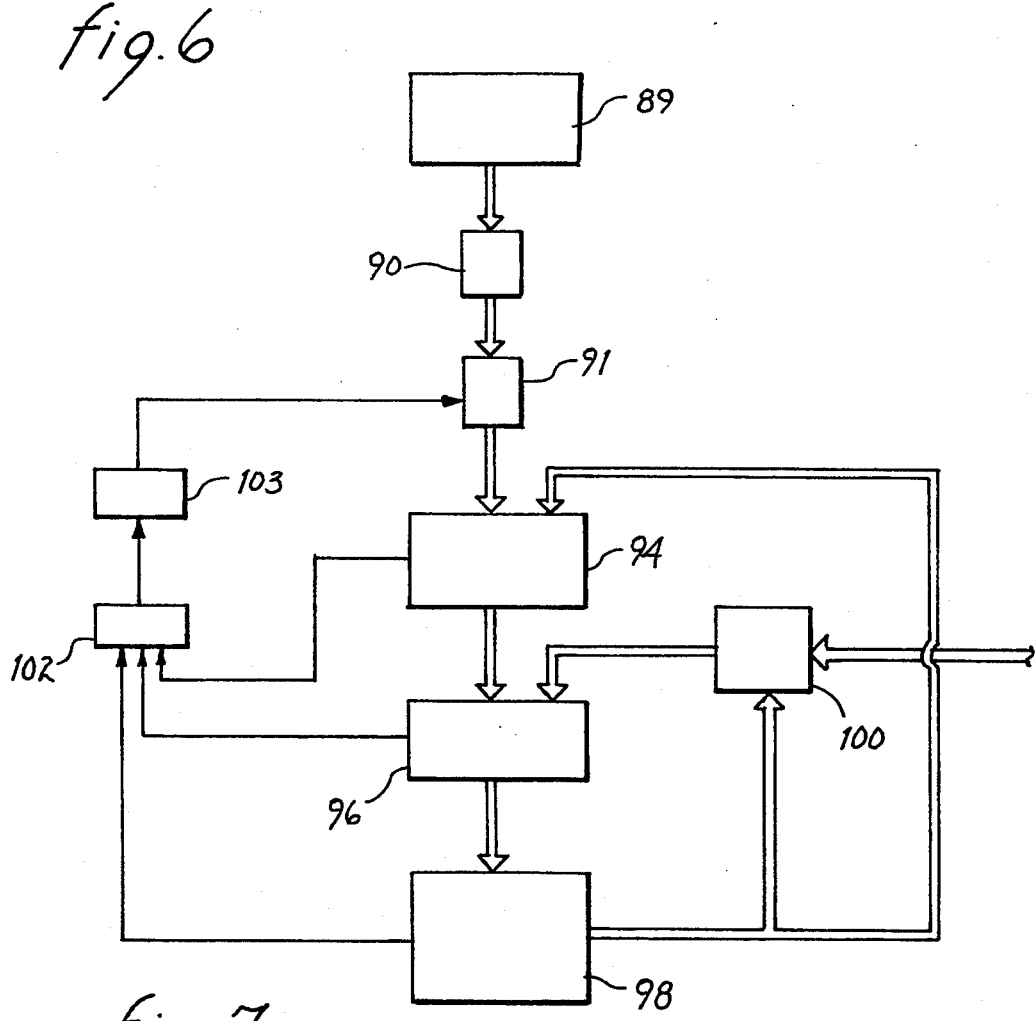
FIG. 7 is a flow diagram useful for the description of the present invention.

Referring now to FIG. 7, a flow chart is shown useful for describing the method of the present invention. Liquid fuel for use in an internal combustion engine is supplied from a fuel storage 89 to a fuel pressurizing means 90 such as a fuel pump. The pressurized fuel in liquid form is atomized through the use of an atomizer 91 such as a fuel injector; the atomized fuel is directed into a vaporization chamber 94 and converted to vapor by adding heat thereto derived from the exhaust heat from the internal combustion engine 98. The fuel, completely vaporized, is then mixed in a fuel/air mixing device 96 with heated air which has been warmed through a heat exchanger 100. The heat exchanger derives heat from the exhaust heat of the internal combustion engine. Operating conditions detected by sensors positioned throughout the system provide electrical signals to the logic module 102 for processing the signals to supply energizing signals through the power module 103 to the atomizing device 91 to thus cause a metered quantity of atomized fuel to be supplied to the vaporization chamber 94. The system of the present invention thus utilizes the steps of pressurizing a liquid fuel, supplying the liquid fuel under pressure to an atomizer, energizing the atomizer to provide a metered quantity of atomized fuel to a vaporization chamber, vaporizing the liquid fuel in the vaporization chamber through the application of exhaust heat to the chamber, supplying the completely vaporized fuel to a fuel/air mixing device while simultaneously heating air and delivering the heated air to the mixing device and subsequently delivering the fuel/air mixture to an internal combustion engine for use therein. The quantity of metered fuel delivered by the atomizer is controlled through the application of energizing signals to the atomizer derived from a power module under the control of a logic module that receives feedback signals from sensors detecting engine conditions and demands.

The configuration of the internal combustion engine will affect the arrangement of elements used in the system of the present invention but will not affect the method of the invention. For example, the physical layout of the engine will determine the positioning of the respective physical components of the system; that is, if the engine is a V configuration, a flat opposed configuration, an in-line configuration . . . , etc., the location of intake and exhaust manifolds may require a rearrangement of certain components of the present system. For example, components may be arranged so that the mixing device may actually be immersed in the exhaust gas to shorten the path of the fuel vapor from the vaporization chamber to the mixing device; in this manner, the fuel will always be subjected to heat during travel to the mixing device to eliminate cooling and changes of condensation. Further, engine response time will be reduced by the shorter vapor path. The apparatus and method of the present invention will reduce exhaust pollution, increase mileage, and increase engine power. Since the fuel/air mixture incorporates only completely vaporized fuel, the fuel will burn more completely, thus reducing or eliminating residual unburned fuel that in present engines bleeds past pistons to dilute oil and increase the oil Ph. This increased acidity in prior art engines necessitates frequent oil changes to remove the deleterious effects of such engine oil contamination. The reduced exhaust pollution may actually permit the elimination of catalytic converters.

It will be apparent to those skilled in the art that with the exception of the vaporization chamber, the components of the system of the present invention are readily available. It will therefore be apparent to those skilled in the art that many modifications can be made without departing from the spirit and scope of the embodiments and examples given above.

What is claimed is:

1. In an internal combustion engine adapted to operate using a vaporized fuel and air mixture and having an intake manifold for supplying said mixture to a combustion chamber therein, said engine producing hot exhaust gases, an improved fuel supply system comprising:
   (a) storage means for storing liquid fuel;
   (b) fuel pressuring means connected to said storage means for pressurizing and delivering fuel from said storage means;
   (c) a vaporization chamber positioned within said exhaust gases for vaporizing liquid fuel;
   (d) a liquid fuel atomizing means connected to receive pressurized fuel from said fuel pressurizing means and positioned to deliver a measured quantity of atomized liquid fuel into said vaporization chamber;
   (e) fuel/air mixing means connected to receive fuel vapor from said vaporization chamber, said mixing means also connected to receive air for mixing with said fuel vapor; and
   (f) means connecting said fuel/air mixing means to said internal combustion engine intake manifold for delivering fuel/air mixture to the combustion chamber thereof.

2. The combination set forth in claim 1 wherein said fuel atomizer is an electrically actuated fuel injector.

3. The combination set forth in claim 2 including a plurality of sensors for detecting engine operating conditions and generating electrical signals in response thereto, means connected to said sensors responsive to said signals for generating fuel injector actuating signals, and means connecting said actuating signals to said fuel injector for actuating said injector to deliver a metered quantity of atomized fuel.

4. In an internal combustion engine adapted to operate using a vaporized fuel and air mixture and having an intake manifold for supplying said mixture to a combustion chamber therein, said engine producing hot exhaust gases, an improved fuel supply system comprising:
   (a) storage means for storing liquid fuel;
   (b) fuel pressuring means connected to said storage means for pressurizing and delivering fuel from said storage means;
   (c) a vaporization chamber for vaporizing liquid fuel, said chamber immersed in said hot exhaust gases for extracting heat from said gases for vaporizing liquid fuel in said chamber;
   (d) a liquid fuel atomizing means connected to receive pressurized fuel from said fuel pressurizing means and positioned to deliver atomized liquid fuel into said vaporization chamber;
   (e) fuel/air mixing means connected to receive fuel vapor from said vaporization chamber, said mixing means also connected to receive air for mixing with said fuel vapor; and
   (f) means connecting said fuel/air mixing means to said internal combustion engine intake manifold for delivering fuel/air mixture to the combustion chamber thereof.

5. The combination set forth in claim 4 wherein said fuel atomizing means is mounted on said vaporization chamber.

6. The combination set forth in claim 4 wherein said vaporization chamber is formed to provide a tortuous path for fuel traveling therethrough and wherein the chamber is formed having thin walls of uniform thickness to facilitate heat transfer from the hot exhaust gases to the fuel in the chamber.

7. The combination set forth in claim 6 wherein said vaporization chamber includes spaced apart top and bottom walls formed to provide a sawtooth path therebetween for fuel and vapor therein.

8. The combination set forth in claim 7 wherein said vaporization chamber includes sidewalls extending between said top and bottom walls, and wherein said sidewalls diverge in the direction of vapor flow at a predetermined angle and then converge at a second predetermined angle.

9. The combination set forth in claim 4 wherein said vaporization chamber includes interior surfaces having a layer of catalytic material thereon.

10. The combination set forth in claim 9 wherein said catalytic material is platinum plated on said surfaces.

11. The combination set forth in claim 8 wherein the sidewalls diverge at an angle from twenty degrees to ninety degrees and then converge at an angle greater than the angle of divergence.

12. The combination set forth in claim 8 wherein the sidewalls diverge at an angle of sixty degrees and then converge at an angle of ninety degrees.

13. In an internal combustion engine adapted to operate using a vaporized fuel and air mixture and having an intake manifold for supplying said mixture to a combustion chamber therein, said engine producing hot exhaust gases, an improved fuel supply system, comprising:
   (a) storage means for storing liquid fuel;
   (b) fuel pressuring means connected to said storage means for pressurizing and delivering fuel from said storage means;
   (c) a vaporization chamber positioned within said exhaust gases for vaporizing liquid fuel;
   (d) a liquid fuel atomizing means connected to receive pressurized fuel from said fuel pressurizing means and positioned to deliver a measured quantity of atomized liquid fuel into said vaporization chamber;
   (e) fuel/air mixing means connected to receive fuel vapor from said vaporization chamber and to receive warmed air for mixing with said fuel vapor;
   (f) air warming means connected to said fuel/air mixing means for receiving outside air and directing said air to a heat exchanger for extracting heat from said exhaust gas and warming said air for delivery to said fuel/air mixing means; and
   (g) means connecting said fuel/air mixing means to said internal combustion engine intake manifold for delivering fuel/air mixture to the combustion chamber thereof.

14. The combination set forth in claim 13 including means responsive to the temperature of air supplied to said fuel/air mixing means for controlling the proportions of warmed and unwarmed air for delivery to said mixing means.

15. A method for supplying fuel to an internal combustion engine adapted to operate using a vaporized fuel and air mixture and having an intake manifold for supplying said mixture to a combustion chamber therein, said engine producing hot exhaust gases, comprising the steps:
   (a) pressurizing liquid fuel;
   (b) atomizing the pressurized liquid fuel;
   (c) directing a metered quantity of said atomized fuel into a vaporization chamber positioned within said hot exhaust gases;

(d) vaporizing said atomized fuel in said vaporization chamber by directing said hot exhaust gases into contact with said vaporization chamber;

(e) mixing the resulting vaporized fuel with air to form a fuel/air mixture; and (f) delivering said fuel/air mixture to the intake manifold of said internal combustion engine.

16. A method for supplying fuel to an internal combustion engine adapted to operate using a vaporized fuel and air mixture and having an intake manifold for supplying said mixture to a combustion chamber therein, said engine producing hot exhaust gases, comprising the steps:

(a) pressurizing liquid fuel;

(b) atomizing the pressurized liquid fuel;

(c) directing a metered quantity of said atomized fuel into a vaporization chamber positioned within said hot exhaust gases;

(d) vaporizing said atomized fuel in said vaporization chamber by directing said hot exhaust gases into contact with said vaporization chamber while simultaneously heating air with heat extracted from said hot exhaust gases;

(e) mixing the resulting vaporized fuel with said heated air to form a fuel/air mixture; and (f) delivering said fuel/air mixture to the intake manifold of said internal combustion engine.

* * * * *